Nov. 11, 1930.   R. S. ALLYN   1,781,533
MACHINE FOR SLITTING SHEETS TO BE STRETCHED
Filed April 26, 1929   2 Sheets-Sheet 1
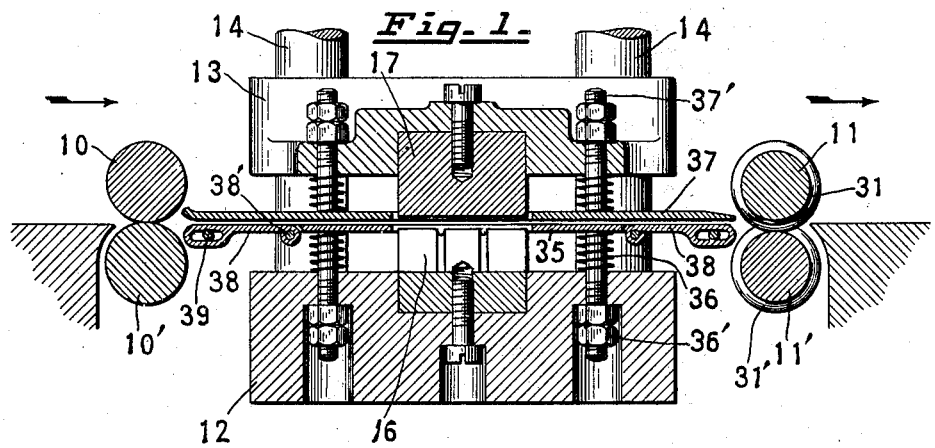
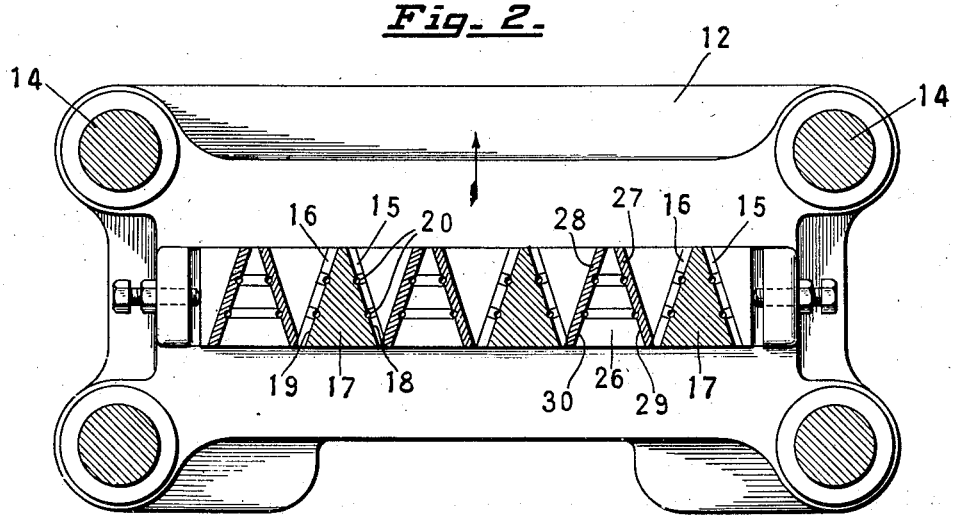
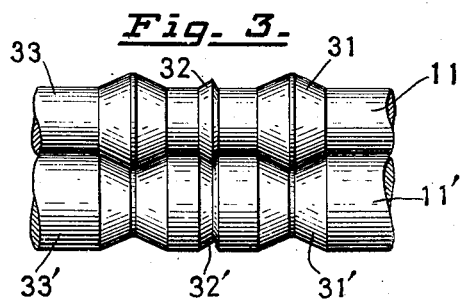
INVENTOR
*Robert S. Allyn,*
BY
ATTORNEY Nov. 11, 1930.  R. S. ALLYN  1,781,533

MACHINE FOR SLITTING SHEETS TO BE STRETCHED

Filed April 26, 1929  2 Sheets-Sheet 2

INVENTOR
Robert S. Allyn,
BY
ATTORNEY

Patented Nov. 11, 1930

1,781,533

UNITED STATES PATENT OFFICE

ROBERT S. ALLYN, OF BROOKLYN, NEW YORK, ASSIGNOR TO ROBERT S. ALLYN, AS TRUSTEE FOR THE BENEFIT OF DWIGHT G. CLARK, OF COOSADA STATION, ALABAMA; LIDA C. CLARK, OF LAKEVILLE, CONNECTICUT; EMIL H. FICKINGER, OF GREAT NECK, AND ROBERT S. ALLYN, OF NEW YORK, N. Y.

MACHINE FOR SLITTING SHEETS TO BE STRETCHED

Application filed April 26, 1929. Serial No. 358,201.

My invention relates particularly to mechanism for slitting sheet metal preparatory to expansion in the manufacture of metal laths or fabrics such as shown in the Clark Patent 930,350.

U. S. Letters Patent 1,146,554, 1,224,523 and 1,314,507 show various mechanisms for slitting metal preparatory to its expansion for instance according to methods of the Clark Patents 979,130, 1,052,888, 1,104,477 and 1,224,877.

My present invention is intended to provide simple and reliable mechanism for slitting the stock according to the desired pattern. Mechanisms of this character usually employ stationary die members and vertically reciprocating punch members which are provided with vertical guides or pillars which hold the punch and die cutters in their proper relation. It has been found that in such slitting mechanism there is a substantial horizontal thrust on the guides. This is believed to be due to the creeping of the stock caused by the flexing thereof at the shearing points away from the cutting edges of the stationary cutters. This thrust of course produces friction and wear on the guides and also tends to pry the punches away from the dies and drag the stock over the edges of the dies so as to produce irregular and uneven cuts which make the subsequent expansion very difficult and sometimes impossible.

I have accordingly rearranged the punch and die cutters so as to in effect balance the shearing stresses not only laterally of the direction of feed, but longitudinally as well and thus relieve the guide pillars or posts of the friction heretofore due to the shearing action. By such means it is possible to increase the speed, reduce the wear on the guides as well as on the cutters, prevent vibration and produce a more uniform product. As an incident more or less to these features the cutters may have a longer life. This of course reduces the cost of the cutters for a given output.

It also reduces the labor of replacement and adjustment and makes it possible to keep the slitting machine in operation a greater length of time.

To effect this balanced shearing stress the cutters are arranged so that one half of the punches cut the strands in front of the coacting dies and one half of the punches cut the strands in rear of the coacting dies, thus balancing the thrusts longitudinally. One half of the punches cut the strands to the right of their dies and one half cut their strands to the left thus balancing the thrusts laterally. As part of the strands are formed behind the dies it is necessary to lift them over the dies in order to permit feeding. I therefore flatten or crush the strands somewhat, preferably by means of spring pressed strippers, so as to ensure more uniform slitting. By properly bending the strands or the ribs or both strands and ribs the stock may be expanded subsequently in various ways.

Fig. 1 is a longitudinal sectional view of one form of mechanism embodying my invention.

Fig. 2 is a plan view and section of the dies and punches specially arranged for balanced shear.

Fig. 3 is a front view of a fragment of feet-out rolls.

The stock is fed into the machine intermittently by rolls 10—10' and fed out intermittently by the rolls 11—11'. The die holder 12 is suitably mounted in the machine and the punch holder 13 is guided on the posts or pillars 14 and actuated intermittently in the usual manner. It will be understood of course that the feed of the rolls may be adjusted to control the widths of the strands in the usual manner and that the stroke of the punch may also be adjusted in any usual manner.

Figure 4:
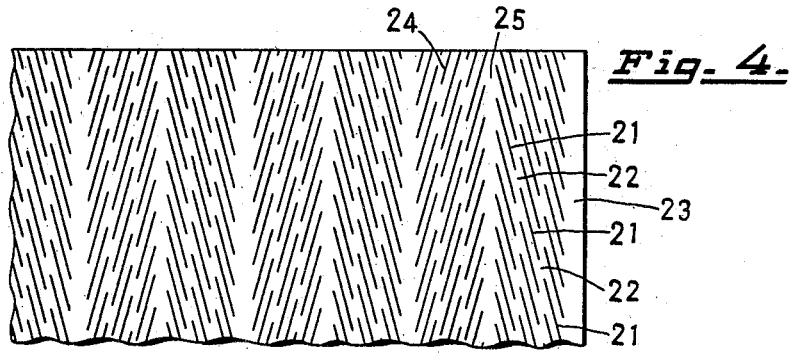
Fig. 4 is a fragmentary detail showing one pattern of slitted stock.

As set forth in the Clark patents the cutters may be either wedge shaped with cutting edges on their opposite faces or in the form of plates held in position by wedges or inclined blocks. In the form shown in Fig. 2 the die cutters 15 and 16 are in the form of flat plates suitably mounted in the holder 12 and the punch cutters 17 which coact with the plates 15 and 16 are in the form of wedges with their opposite edges 18 and 19 inclined forwardly toward each other and coating with the corresponding sharpened edges of the plates 15 and 16. These cutting edges of the punches and/or of the dies may be interrupted in the usual way at a suitable number of positions, such as 20, so as to form the desired number of bonds or strands. In Fig. 4 I have shown a row of slits 21—21—21 formed by cutters such as above mentioned and leaving between them bonds 22—22. The cutters are so arranged with respect to the width of the sheet to be slitted that marginal unslitted strips or ribs 23 are left. Slits 24 similar to the slits 21 are formed by the cutting edges 19 but inclined reversely. The cutting edges of the punches and dies above described are arranged to leave an unslitted strip or rib 25 between the oppositely inclined slits 21 and 24. If we consider the stock as being fed in the direction of the arrows in Figs. 1 and 2 it will be seen that the strands are formed in the rear of the cutting edges of the dies 15 and 16, so that the stock has to be lifted after each stroke before it can be fed forward.

Alternating with the sets of punches and dies just described are other sets of punches and dies consisting of the wedge shaped die cutters 26 and the plate punch cutters 27 and 28 arranged to cut the stock in front of the dies instead of in the rear, thus leaving the stock free to be fed forward after the slitting action. The cutting edges 29 and 30 form slitted sections similar to the ones above described. These different sets will be spaced apart from each other laterally so as to leave unslitted strips or ribs of the desired width.

The arrangement of cutters as above described produces a substantially balanced cut so that there is no side thrust on the guide posts or pillars 14. The die cutters 15—15 are arranged in a row transversely of the feed, parallel to each other and the thrust occasioned by the shearing action of the right hand edges of the punches 17—17 is rearwardly and to the left. The shearing stress occasioned by the action of the left hand faces of the punch cutters 17—17 coacting with the right hand faces of the row of die cutters 16—16 is rearwardly and to the right thus balancing the transverse thrust but leaving the longitudinal rearward thrust unbalanced. The action of the row of punch cutters 27—27 against the right hand edges of the die cutters 26—26 is to create a thrust forwardly and to the right. The action of the punch cutters 28—28 coacting with the left hand edges of the die cutters 26—26 is to produce a thrust forwardly and to the left. It will thus be seen that the transverse thrust created by the action of the punch cutters 27 and 28 is balanced but leaves the longitudinal thrust forwardly. By having an equal number of sets of punches and die cutters as above set forth the forward and rearward stresses are balanced.

When it is desired to give especial inclination to the strands or ribs the feeding out rolls 11—11', may be provided with specially shaped conical portions, such as 31—31', for setting the strands, and beads and grooves 32—32' for setting the ribs, as shown in Fig. 3. The slitted sections may be flattened if desired by the cylindrical portions 33—33' of these rolls.

In order to prevent the stock from sticking to the punch and die cutters I provide suitable stripping plates as shown in Fig. 1. The stripping plate 35 is supported on springs 36 and adjusting studs 36' and provided with suitable passages for the die cutters. This plate is adjusted to a height slightly above the upper face of the die cutters and is adapted to be depressed when the punch member impacts against it. The upper stripper plate 37 is similarly spring pressed downwardly and provided with adjusting studs 37' so that its lower face may normally be slightly below the lower face of the punch cutters. The front and rear edges of the die stripper 35 are preferably provided with introductory and delivery guide portions 38 hinged to the stripper at 38' and provided with guide pins 39 so that as the main body of the stripper plate is adjusted up and down to correspond with the height of the die cutters, the outer edges of the guide plates will remain substantially on a level with the sheet which is fed through the rolls 10—10' and delivered to the rolls 11—11'.

By suitably shaping and adjusting the upper and lower stripper plates they may be made to bear on the slitting stock after each stroke of the press so as to somewhat crush or flatten the strands as they are formed. The lower or die stripper plate is specially essential beneath the punch cutters which draw the stock down in rear of the dies, for instance beneath the punch cutters 17—17, since it is necessary to lift the strands thus formed up sufficiently to clear the faces of the dies 15 and 16. It is also quite desirable that the punch stripper 37 engage these strands at the next slitting stroke so as to steady them while the next row of slits is being formed.

Figure 5:
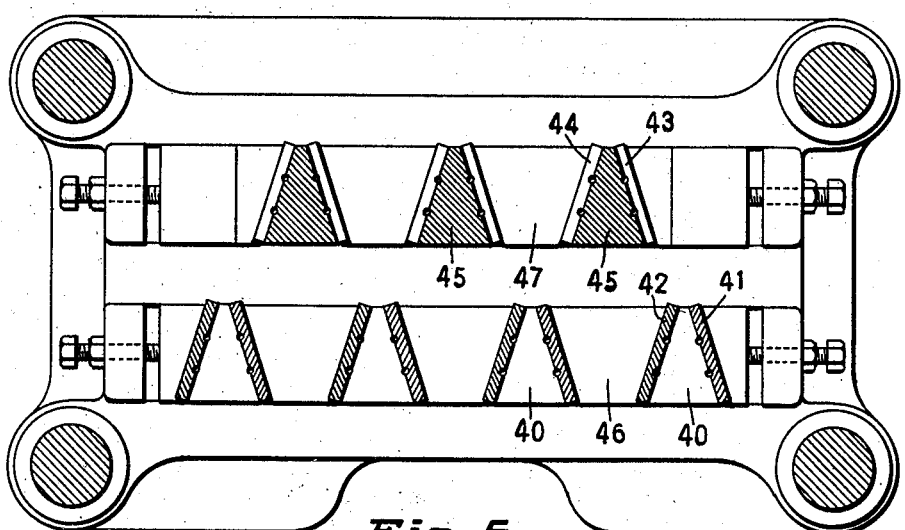
Fig. 5 is a plan view and section showing a modification in which plate and wedge cutters are arranged in two parallel rows spaced apart from each other in the direction of feed.

In the alternative arrangement of cutters shown in Fig. 5 the sets of cutters for slitting adjacent sections of the stock are mounted in staggered arrangement in two rows spaced apart from each other longitudinally of the machine. The die cutters 40—40 are wedge shaped and the punch cutters 41 and 42 are in the form of plates which cut the strands in front of the opposite inclined die faces. The alternate sets consist of oppositely inclined die plates 43 and 44 with coacting wedge shaped punch cutters 45 which cut the strands in rear of the die cutters. The space 46 between the adjacent die cutters 40—40 is slightly wider than the heel of the punch cutters 45 so as to leave unslitted strips between the slitted sections. The sets of cutters in the upper or front row are similarly mounted to leave spaces 47 for the sections slitted by the cutters immediately in rear thereof.

In this arrangement of Fig. 5 it will be seen that there are four sets of cutters in the rear row which produce a laterally balanced shearing stress and a forwardly unbalanced shearing stress. The three sets of cutters in the front row produce laterally balanced shearing stresses but unbalanced rearward shearing stresses. As there are more cutters in the rear row than in the front row the shearing stress longitudinally will not be completely balanced but will leave a forward unbalanced component of shearing stress, which of course must be borne by the guide posts or pillars 14.

Figure 6:
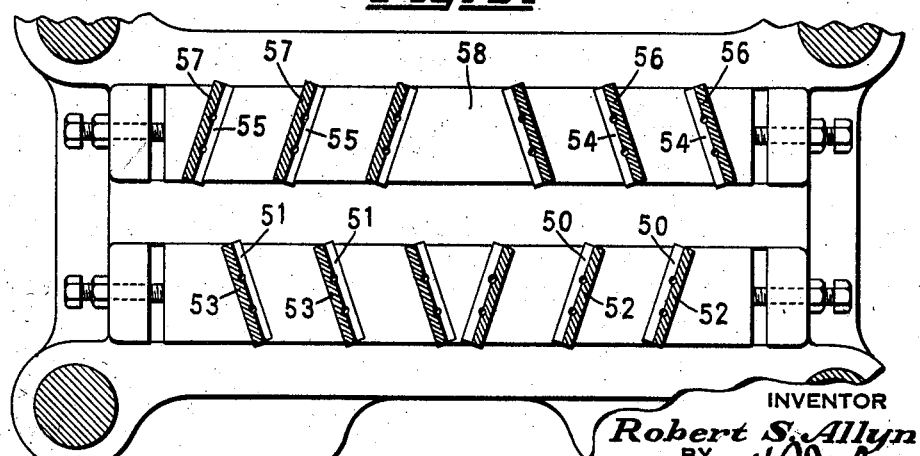
Fig. 6 is a plan view and section showing another modification in which plate cutters are arranged to produce a balanced shear.

In the arrangement shown in Fig. 6 I have shown plate cutters for both punches and dies arranged in two rows spaced apart from each other in the direction of the feed. In the rear row the die cutters 50—50 are inclined opposite to the die cutters 51—51. The punch cutters 52—52 and 53—53 are arranged to coact with the die cutters 50 and 51 respectively so that the shearing stresses are balanced laterally but unbalanced longitudinally. The cutters in the front row are reversely inclined and arranged to produce a laterally balanced shear and a longitudinal unbalanced shear which offsets the unbalanced longitudinal shear in the rear row of cutters. The die cutters 54 on one side of center are inclined in an opposite direction to the die cutters 55 and the punch cutters 56 and 57 coact with them respectively.

The central space 58 between the right and left hand sets of cutters is slightly wider than the area slitted by the two central plates or cutters in the rear row. The cutters in the rear row are lined up with the spaces between the cutters in the front row so as to leave the necessary unslitted strips to form the ribs of the fabric after it is expanded.

It will be understood that the cutters may be formed in any suitable manner with their cutting edges interrupted so as to provide the desired number of bonds and strands for the slitted sections and that the cutters may be mounted in the holders in any suitable manner. It should be understood that the stock after it is slitted may be stretched or expanded in any suitable manner and by any suitable mechanism.

The forms of my invention embodying the arrangements shown in Figs. 5 and 6 are specifically claimed in my copending application filed Sept. 27, 1930, Serial Number 484,740.

I claim:

1. Slitting mechanism comprising feed rolls, punch and die members, a spring pressed stripper plate having openings for the die members, a guide member hinged at one end to said plate and a stop holding the other end of said guide member adjacent said feed rolls.

2. A machine having spaced sets of punch and die cutters with inclined cutting edges for slitting stock according to a reverse lay design with inclined slits and leaving unslitted longitudinal strips between the slitted sections, a spring lifted stripper plate surrounding the die cutters, feed rolls for feeding stock to said cutters over said stripper plate, a guide plate connected at one edge to said stripper plate and movable up and down therewith and means for holding the opposite edge of said guide plate just below the exit from said feed rolls and a spring pressed plate movable up and down with the punch cutters and adapted to engage and flatten strands against the die stripper alongside of the die cutters on the stroke immediately after they are cut.

3. Slitting mechanism comprising feed rolls, punch and die members, the punch member reciprocating with respect to the die member, each member having a transverse recess, guides for the punch member, die cutters in the die recess having cutting edges alternately inclined to the right and left of the direction of feed for producing a reverse lay of strands with unslitted strips between the slitted sections and coacting punch cutters in the punch recess, some of the punch cutters cutting forwardly and to the right of the corresponding die cutters, some of the punch cutters cutting forwardly and to the left, some of the punch cutters cutting rearwardly and to the right, some of the punch cutters cutting rearwardly and to the left, to produce substantially balanced horizontal shearing stresses laterally and longitudinally.

4. Slitting mechanism, comprising a reciprocating punch member and a stationary die member, said die member having a row of wedge shaped die cutters with spaces between them, punch plates coacting with said die cutters, oppositely inclined die plates arranged in said spaces between the wedge shaped die cutters, wedge shaped punch cutters coacting with said die plates and guides for keeping the punch and die members in alinement the punch plates and wedge-shaped punch cutters being carried by and reciprocable with the punch member.

5. Slitting mechanism as set forth in claim 4 combined with means for engaging and partially flattening strands on the next stroke immediately after the stroke which formed the strands.

6. Slitting mechanism comprising feed rolls, punch and die members having coacting cutting edges inclined slightly to the direction of feed and arranged to slit the stock into alternate slitted and unslitted sections, guide posts for the punch members, the punch members being reciprocable on the guide posts, and the cutters being so arranged that substantially one half of the punches cut strands forwardly of their dies and the remainder of the punches cut strands rearwardly of their dies, substantially one half of the punches cut strands to the right of their dies and the remainder of the punches cut strands to the left of their dies whereby the horizontal shearing stresses are substantially balanced laterally and longitudinally.

7. Slitting mechanism comprising punch and die members having cooperating guides, the punch member being reciprocable on the guides, means for feeding sheets between the punch and die members, cutters carried by the respective members with cutting edges alternately inclined in opposite directions to produce a reverse lay of strands between unslitted strips, some of the punch cutters being arranged to cut strands in front of the coacting die cutters and the remainder of the punch cutters being arranged to cut strands in rear of the coacting die cutters to substantially balance the shearing thrust longitudinally of the direction of feed and strippers arranged to lift the latter strands from behind the die cutters, some of the punch cutters cutting to the right of their die cutters and some of the punch cutters cutting to the left of their die cutters to substantially balance the shearing thrust laterally of the direction of feed.

8. Slitting mechanism comprising punch and die holders one of which is reciprocable with respect to the other, means for guiding the reciprocable holder, means for feeding stock forwardly between the punch and die holders, cooperating punch and die cutters supported in said holders and having cutting edges inclined to the direction of feed, the alternate cutting edges of the die cutters and their cooperating punch cutting edges being inclined forwardly and to the right and the other cutting edges being inclined forwardly and to the left, approximately one fourth of the punch cutting edges being arranged to form strands in front and to the right of the cooperating die cutting edges, approximately one fourth of the punch cutting edges being arranged to form strands in front and to the left of the cooperating die cutting edges, approximately one fourth of the punch cutting edges being arranged to form strands to the rear and to the right of the cooperating die cutting edges and approximately one fourth of the punch cutting edges being arranged to form strands to the rear and to the left of the cooperating die cutting edges.

9. Slitting mechanism as set forth in claim 8 in further combination with means in line with those punch cutters which are in rear of their cooperating die cutters for flattening only those strands cut by said cutters.

10. Slitting mechanism comprising punch and die members having cutting edges spaced and inclined to form inclined strands connected by longitudinal unslitted strips, a reciprocable cross head carrying the punch members, a spring supported stripper plate having openings for the die members, a downwardly spring pressed stripper plate carried by the cross head and having openings for the punch members, and means for adjusting said stripper plates vertically, said stripper plates cooperating to flatten slitted strands.

ROBERT S. ALLYN.